US012712652B2

(12) United States Patent
Tomala et al.

(10) Patent No.: US 12,712,652 B2
(45) Date of Patent: Aug. 18, 2026

(54) AI/ML CONFIGURATION FEEDBACK

(71) Applicant: Nokia Technologies Oy, Espoo (FI)

(72) Inventors: Malgorzata Tomala, Wroclaw (PL); Anna Pantelidou, Massy (FR); Amaanat Ali, Espoo (FI); Sina Khatibi, Munich (DE); Ethiraj Alwar, Bangalore (IN)

(73) Assignee: Nokia Technologies Oy, Espoo (FI)

(*) Notice: Subject to any disclaimer, the term of this patent is extended or adjusted under 35 U.S.C. 154(b) by 232 days.

(21) Appl. No.: 18/477,156

(22) Filed: Sep. 28, 2023

(65) Prior Publication Data

US 2024/0113796 A1 Apr. 4, 2024

(30) Foreign Application Priority Data

Sep. 29, 2022 (GB) ..................................... 2214271

(51) Int. Cl.
*H04B 17/391* (2015.01)
*H04B 17/20* (2015.01)

(52) U.S. Cl.
CPC ....... *H04B 17/3913* (2015.01); *H04B 17/201* (2023.05)

(58) Field of Classification Search
CPC . H04B 17/3913; H04B 17/201; H04W 24/02; H04W 24/10; G06N 20/00; G06F 1/20
See application file for complete search history.

(56) References Cited

U.S. PATENT DOCUMENTS 11,424,962 B2 8/2022 Kumar et al.
11,934,867 B2* 3/2024 Damani ................ G06F 9/3851
2017/0126792 A1* 5/2017 Halpern .............. H04L 43/0894
2021/0232190 A1 7/2021 Zhu et al.
2021/0281592 A1 9/2021 Givental et al.

(Continued)

FOREIGN PATENT DOCUMENTS

WO 2021/047781 A1 3/2021
WO 2021/224705 A1 11/2021
WO 2022/008037 A1 1/2022

(Continued)

OTHER PUBLICATIONS

"3rd Generation Partnership Project; Technical Specification Group Radio Access Network; NR; NR and NG-RAN Overall Description; Stage 2 (Release 17)", 3GPP TS 38.300, V17.0.0, Mar. 2022, pp. 1-204.

(Continued)

*Primary Examiner* — Natasha W Cosme
(74) *Attorney, Agent, or Firm* — Brake Hughes Bellermann LLP

(57) ABSTRACT

Apparatus comprising:
- one or more processors, and memory storing instructions that, when executed by the one or more processors, cause the apparatus to perform:
- monitoring whether a terminal suffers a performance issue due to an artificial intelligence/machine learning operation performed by the terminal;
- performing an action related to the artificial intelligence/machine learning operation to remove or reduce the performance issue if the terminal suffers the performance issue due to the artificial intelligence/machine learning operation.

11 Claims, 9 Drawing Sheets

(56) References Cited

U.S. PATENT DOCUMENTS

2022/0104055 A1 3/2022 Wahaj Arshad et al.
2022/0182824 A1* 6/2022 Zheng .................... G06N 3/044

FOREIGN PATENT DOCUMENTS

WO 2022/133866 A1 6/2022
WO 2022/148494 A1 7/2022
WO 2023/022642 A1 2/2023

OTHER PUBLICATIONS

"3rd Generation Partnership Project; Technical Specification Group Radio Access Network; NR; Radio Resource Control (RRC) protocol specification (Release 17)", 3GPP TS 38.331, V17.0.0, Mar. 2022, pp. 1-1221.
"3rd Generation Partnership Project; Technical Specification Group Radio Access Network; NG-RAN; Architecture description (Release 17)", 3GPP TS 38.401, V17.1.1, Jul. 2022, pp. 1-122.
"3rd Generation Partnership Project; Technical Specification Group Radio Access Network; Evolved Universal Terrestrial Radio Access (E-UTRA) and NR; Study on enhancement for Data Collection for NR and EN-DC (Release 17)", 3GPP TR 37.817, V17.0.0, Apr. 2022, pp. 1-23.
"Revised WID: Artificial Intelligence (AI)/Machine Learning (ML) for NG-RAN", 3GPP TSG RAN Meeting #95e, RP-220635, Agenda: 9.3.3.4, CMCC, Mar. 17-23, 2022, 7 pages.
"Msc-generator", Sourceforge, Retrieved on Dec. 23, 2023, Webpage available at : https://sourceforge.net/projects/msc-generator/.
"Summary of Offline Discussion on High-Level Principles and Definitions", 3GPP TSG-RAN WG3 #110-e, R3-206873, Agenda: 18.2, Samsung, Jun. 2-12, 2020, 18 pages.
"Summary of General Aspects of AI/ML Framework", 3GPP TSG RAN WG1 #109-e, R1-22xxxxx, Agenda: 9.2.1, Qualcomm, May 9-20, 2022, pp. 1-106.
"Use case on shared AI/ML model monitoring", 3GPP TSG-SA WG1 Meeting #93e, S1-210209r4, Nokia Shanghai Bell, Feb. 22-Mar. 4, 2021, 2 pages.
Search Report received for corresponding United Kingdom Patent Application No. 2214271.5, dated Mar. 9, 2023, 3 pages.
"Revised SID: Study on Artificial Intelligence (AI)/Machine Learning (ML) for NR Air Interface ", 3GPP TSG RAN Meeting #96, RP-221348, Agenda: 9.2.8, Qualcomm, Jun. 6-9, 2022, 6 pages.
Extended European Search Report received for corresponding European Patent Application No. 23192958.9, dated Feb. 15, 2024, 9 pages.

* cited by examiner 310
320
330
340
Fig. 12
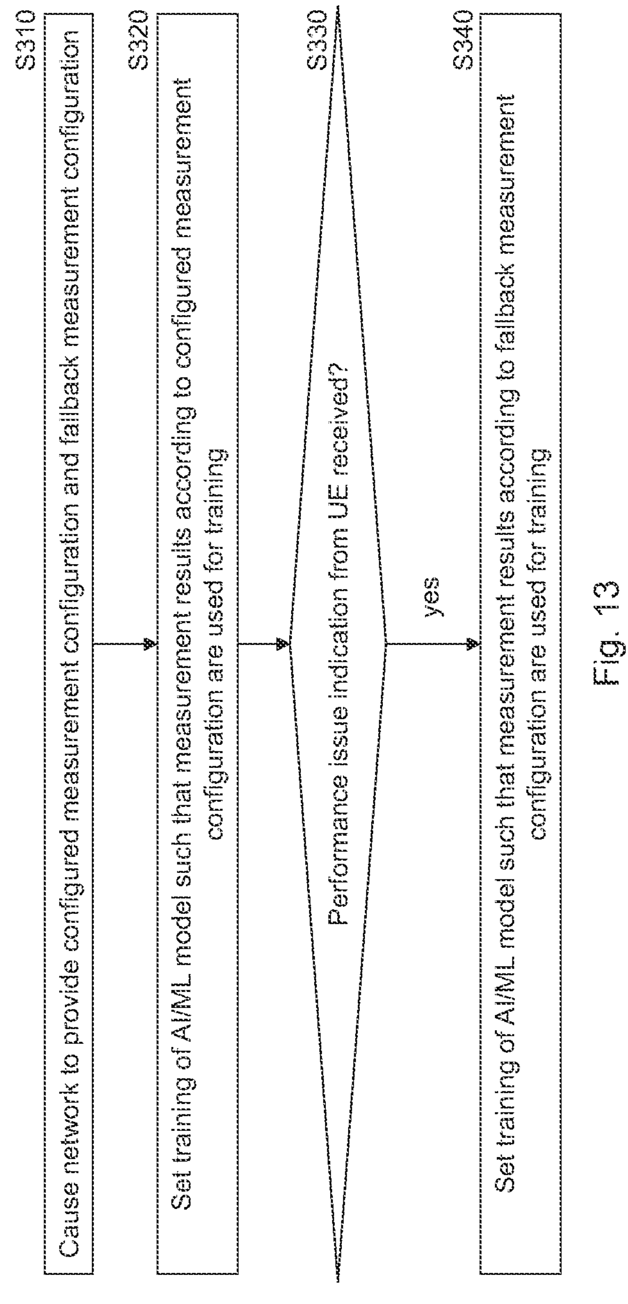
Fig. 13
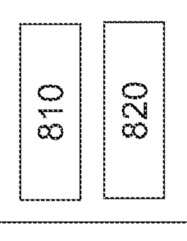
Fig. 14

AI/ML CONFIGURATION FEEDBACK

FIELD OF THE INVENTION

The present disclosure relates AI/ML operation.

Abbreviations

3GPP 3$^{rd}$ Generation Partnership Project
5G/6G/7G 5$^{th}$/6$^{th}$/7$^{th}$ Generation
AI Artificial Intelligence
EN-DC E-UTRA—NR Dual Connectivity
E-UTRA Evolved Universal Terrestrial Radio Access
gNB next Generation NodeB
GPS Global Positioning System
MDT Minimization of Drive Tests
ML Machine Learning
NG-RAN Next Generation RAN
NR New Radio
NW Network
RAN Radio Access Network
RLF Radio Link Failure
RRC Radio Resource Control
RRM Radio Resource Management
RSRP Reference Signal Received Power
RSRQ Reference Signal Received Quality
SINR Signal over Interference and Noise Ratio
TR Technical Report
UE User Equipment
WiFi Wireless Fidelity

BACKGROUND 5G networks deployment plans study how to utilize Machine Learning and Artificial Intelligence in mobile network. A current challenge for ML/AI use in 5G is the question how to apply its power and benefits in mobile networks for the retrieval of massive quantity of RAN data and how to adapt intelligent features (based on ML-assisted algorithms) to ease network management. In this context, 3GPP conducted the study item 880076 “Study on enhancement for data collection for NR and EN-DC”, which analyzed requirements, general high-level principles, AI/ML functional framework and recommended potential solutions for the anticipated use cases. In particular, three use cases are identified for AI/ML techniques utility: Mobility Optimization, Network Energy Saving and Load Balancing. To optimize the decisions on mobility, energy saving, or load balancing, it is assumed that AI/ML-based solutions will be used to predict and make better decisions on system performance by leveraging the data collected in the RAN network (see 3GPP TR 37.817).

FIG. 1 (taken from 3GPP TR 37.817) depicts an exemplary signalling flow for the AI/ML data collection related to Load Balancing with Model Training and Model interface in a NG-RAN. The steps depicted in FIG. 1 for load balancing between NG-RAN node 1 and NG-RAN node 2 are substantially as follows:

Step 0: As an option, NG-RAN node 2 may have an AI/ML model, which can provide NG-RAN node 1 with useful input information, such as predicted resource status, etc.

Step 1: The NG-RAN node 1 configures UE to provide measurements and/or location information (e.g., RRM measurements, MDT measurements, velocity, position).

Step 2: The UE collects the indicated measurement(s), e.g., UE measurements related to RSRP, RSRQ, SINR of the serving cell and neighbouring cells.

Step 3: The UE reports to NG-RAN node 1 the requested measurements and/or location information (e.g., UE measurements related to RSRP, RSRQ, SINR of serving cell and neighbouring cells, velocity, position).

Step 4: The NG-RAN node 1 receives from the neighbouring NG-RAN node 2 the input information for training of a model related to load balancing.

Step 5: An AI/ML Model Training is located at NG-RAN node 1. The required measurements and input data from other NG-RAN nodes are leveraged to train the AI/ML model.

Step 6: NG-RAN node 1 receives UE measurements and/or location information.

Step 7: NG-RAN node 1 can receive from the neighbouring NG-RAN node 2 the input information for load balancing model inference.

Step 8: NG-RAN node 1 performs model inference and generates Load Balancing predictions or decisions.

Step 9: NG-RAN node 1 may take Load Balancing actions and the UE is moved from NG-RAN node 1 to NG-RAN node 2.

Step 10: NG-RAN node 2 sends feedback information to NG-RAN node 1 (e.g., resource status updates after load balancing, etc).

According to 3GPP TR 37.817, it is intended to use UE-based data collection, reuse the existing MDT and RRM measurements with potential MDT procedures enhancements.

MDT feature has been defined for 4G networks (and networks of later generations) to mitigate operator’s efforts spent on collecting end users feedback on network performance through drive tests. It enables automated real time and logged radio metrics collection by defining supportive NW procedures over radio interface and device actions in RRC protocol.

SUMMARY

It is an object of the present invention to improve the prior art.

According to a first aspect of the invention, there is provided an apparatus comprising:

- one or more processors, and memory storing instructions that, when executed by the one or more processors, cause the apparatus to perform:
- monitoring whether a terminal suffers a performance issue due to an artificial intelligence/machine learning operation performed by the terminal;
- performing an action related to the artificial intelligence/machine learning operation to remove or reduce the performance issue if the terminal suffers the performance issue due to the artificial intelligence/machine learning operation.

The artificial intelligence/machine learning operation may comprise at least one of the following:

- data collection for the training of an artificial intelligence/machine learning model;
- performing training of the artificial intelligence/machine learning model; or
- transmitting the data collected for training of the artificial intelligence/machine learning model.

The action may comprise at least one of the following:

- reducing a volume of data to be collected per time if the artificial intelligence/machine learning operation comprises data collection for the training of the artificial intelligence/machine learning model;

reducing a resolution of the data to be collected if the artificial intelligence/machine learning operation comprises data collection for the training of the artificial intelligence/machine learning model;

requesting a network controlling the terminal to configure the terminal such that the volume of the data to be collected per time and/or the resolution of the data to be collected for the training of the artificial intelligence/machine learning model is reduced if the artificial intelligence/machine learning operation comprises data collection for the training of the artificial intelligence/machine learning model;

extending the time for the training of an artificial intelligence/machine learning model if the artificial intelligence/machine learning operation comprises performing training of the artificial intelligence/machine learning model;

suspending or stopping performing a training of an artificial intelligence/machine learning model if the artificial intelligence/machine learning operation comprises performing the training of the artificial intelligence/machine learning model by the terminal; or inhibiting transmitting the data collected for training of the artificial intelligence/machine learning model and logging the data collected for the training for a certain time period or until a certain event occurs if the artificial intelligence/machine learning operation comprises transmitting the data collected for the training of the artificial intelligence/machine learning model.

The instructions, when executed by the one or more processors, may further cause the apparatus to perform:

supervising whether the terminal receives, from the network, in addition to a configured measurement configuration, a fallback measurement configuration for a case that the terminal suffers the performance issue due to the artificial intelligence/machine learning operation; wherein the action comprises adopting the fallback measurement configuration in the terminal if the terminal receives the fallback measurement configuration.

The instructions, when executed by the one or more processors, may cause the apparatus to perform the monitoring whether the terminal suffers the performance issue due to the artificial intelligence/machine learning operation by at least one of the following criteria:

monitoring whether the performance issue occurs more frequently than a frequency threshold; or performing an activity for resolving the performance issue and then monitoring whether the performance issue is not solved due to the activity, wherein the activity is not related to the artificial intelligence/machine learning operation; or monitoring whether the training of the artificial intelligence/machine learning model takes longer than expected if the training of the artificial intelligence/machine learning training is performed by the terminal; or monitoring whether the terminal uses too many resources.

The instructions, when executed by the one or more processors, may cause the apparatus to perform:

supervising whether a configured condition for at least one of the criteria is received from the network;

adopting the configured condition for the at least one of the criteria if the configured condition for the at least one of the criteria is received from the network.

adopting a preconfigured condition for the at least one of the criteria if the configured condition for the at least one of the criteria is not received from the network.

The status of the artificial intelligence/machine learning operation may be reflected in a state machine, wherein the state machine may have the statuses active, impaired, and inactive.

According to a second aspect of the invention, there is provided an apparatus comprising:

one or more processors, and memory storing instructions that, when executed by the one or more processors, cause the apparatus to perform:

monitoring whether a network receives a performance issue indication from a terminal, wherein the performance issue indication indicates that the terminal suffers a performance degradation due to a artificial intelligence/machine learning operation performed by the terminal;

causing the network to instruct the terminal to perform an action related to the artificial intelligence/machine learning operation to remove or reduce the performance issue if the network receives the performance issue indication.

According to a third aspect of the invention, there is provided an apparatus comprising:

one or more processors, and memory storing instructions that, when executed by the one or more processors, cause the apparatus to perform:

causing a network to provide, to a terminal, a configured measurement configuration and a fallback measurement configuration different from the configured measurement configuration;

setting a training of an artificial intelligence/machine learning model such that measurement results according to the configured measurement configuration are used for the training;

monitoring whether the network receives a performance issue indication from the terminal, wherein the performance issue indication indicates that the terminal suffers a performance degradation due to an artificial intelligence/machine learning operation performed by the terminal;

setting the training of the artificial intelligence/machine learning model such that measurement results according to the fallback measurement configuration are used for the training if the network receives the performance issue indication from the terminal.

For the apparatus of each of the second and third aspects, one or more of the following may apply:

The artificial intelligence/machine learning operation may comprise at least one of the following:

data collection for the training of an artificial intelligence/machine learning model;

performing training of the artificial intelligence/machine learning model; or transmitting the data collected for training of the artificial intelligence/machine learning model.

The action may comprise at least one of the following:

configuring the terminal such that the volume of the data collected per time for the artificial intelligence/machine learning operation is reduced if the artificial intelligence/machine learning operation comprises data collection for training of the artificial intelligence/machine learning model;

configuring the terminal such that the resolution of the data collected for the artificial intelligence/machine learning operation is reduced if the artificial intelligence/machine learning operation comprises data collection for training of the artificial intelligence/machine learning model;

extending the time for the training if the artificial intelligence/machine learning operation comprises performing the training of the artificial intelligence/machine learning model;

requesting the terminal to suspend or stop the performing the training if the artificial intelligence/machine learning operation comprises performing the training of an artificial intelligence/machine learning model by the terminal; or configuring the terminal such that the data to be collected for the training are not transmitted but logged for a certain time period or until a certain event occurs if the artificial intelligence/machine learning operation comprises transmission of the data for training of the artificial intelligence/machine learning model.

The instructions, when executed by the one or more processors, may further cause the apparatus to perform:

extending the time for training the artificial intelligence/machine learning model if the network receives the performance issue indication from the terminal.

The instructions, when executed by the one or more processors, may further cause the apparatus to perform:

providing, to the terminal, a condition for at least criterion to decide whether or not a performance degradation is due to the artificial intelligence/machine learning operation.

According to a fourth aspect of the invention, there is provided a method comprising:

monitoring whether a terminal suffers a performance issue due to an artificial intelligence/machine learning operation performed by the terminal;

performing an action related to the artificial intelligence/machine learning operation to remove or reduce the performance issue if the terminal suffers the performance issue due to the artificial intelligence/machine learning operation.

The artificial intelligence/machine learning operation may comprise at least one of the following:

data collection for the training of an artificial intelligence/machine learning model;

performing training of the artificial intelligence/machine learning model; or transmitting the data collected for training of the artificial intelligence/machine learning model.

The action may comprise at least one of the following:

reducing a volume of data to be collected per time if the artificial intelligence/machine learning operation comprises data collection for the training of the artificial intelligence/machine learning model;

reducing a resolution of the data to be collected if the artificial intelligence/machine learning operation comprises data collection for the training of the artificial intelligence/machine learning model;

requesting a network controlling the terminal to configure the terminal such that the volume of the data to be collected per time and/or the resolution of the data to be collected for the training of the artificial intelligence/machine learning model is reduced if the artificial intelligence/machine learning operation comprises data collection for the training of the artificial intelligence/machine learning model;

extending the time for the training of an artificial intelligence/machine learning model if the artificial intelligence/machine learning operation comprises performing training of the artificial intelligence/machine learning model;

suspending or stopping performing a training of an artificial intelligence/machine learning model if the artificial intelligence/machine learning operation comprises performing the training of the artificial intelligence/machine learning model by the terminal; or inhibiting transmitting the data collected for training of the artificial intelligence/machine learning model and logging the data collected for the training for a certain time period or until a certain event occurs if the artificial intelligence/machine learning operation comprises transmitting the data collected for the training of the artificial intelligence/machine learning model.

The method may further comprise:

supervising whether the terminal receives, from the network, in addition to a configured measurement configuration, a fallback measurement configuration for a case that the terminal suffers the performance issue due to the artificial intelligence/machine learning operation; wherein the action comprises adopting the fallback measurement configuration in the terminal if the terminal receives the fallback measurement configuration.

The monitoring whether the terminal suffers the performance issue due to the artificial intelligence/machine learning operation may be based on at least one of the following criteria:

monitoring whether the performance issue occurs more frequently than a frequency threshold; or performing an activity for resolving the performance issue and then monitoring whether the performance issue is not solved due to the activity, wherein the activity is not related to the artificial intelligence/machine learning operation; or monitoring whether the training of the artificial intelligence/machine learning model takes longer than expected if the training of the artificial intelligence/machine learning training is performed by the terminal; or monitoring whether the terminal uses too many resources.

The method may further comprise:

supervising whether a configured condition for at least one of the criteria is received from the network;

adopting the configured condition for the at least one of the criteria if the configured condition for the at least one of the criteria is received from the network.

adopting a preconfigured condition for the at least one of the criteria if the configured condition for the at least one of the criteria is not received from the network.

The status of the artificial intelligence/machine learning operation may be reflected in a state machine, wherein the state machine may have the statuses active, impaired, and inactive.

According to a fifth aspect of the invention, there is provided a method comprising:

monitoring whether a network receives a performance issue indication from a terminal, wherein the performance issue indication indicates that the terminal suffers a performance degradation due to a artificial intelligence/machine learning operation performed by the terminal;

causing the network to instruct the terminal to perform an action related to the artificial intelligence/machine learning operation to remove or reduce the performance issue if the network receives the performance issue indication.

According to a sixth aspect of the invention, there is provided a method comprising:

causing a network to provide, to a terminal, a configured measurement configuration and a fallback measurement configuration different from the configured measurement configuration;

setting a training of an artificial intelligence/machine learning model such that measurement results according to the configured measurement configuration are used for the training;

monitoring whether the network receives a performance issue indication from the terminal, wherein the performance issue indication indicates that the terminal suffers a performance degradation due to an artificial intelligence/machine learning operation performed by the terminal;

setting the training of the artificial intelligence/machine learning model such that measurement results according to the fallback measurement configuration are used for the training if the network receives the performance issue indication from the terminal.

For the method of each of the fifth and sixth aspects, one or more of the following may apply:

The artificial intelligence/machine learning operation may comprise at least one of the following:

data collection for the training of an artificial intelligence/machine learning model;

performing training of the artificial intelligence/machine learning model; or transmitting the data collected for training of the artificial intelligence/machine learning model.

The action may comprise at least one of the following:

configuring the terminal such that the volume of the data collected per time for the artificial intelligence/machine learning operation is reduced if the artificial intelligence/machine learning operation comprises data collection for training of the artificial intelligence/machine learning model;

configuring the terminal such that the resolution of the data collected for the artificial intelligence/machine learning operation is reduced if the artificial intelligence/machine learning operation comprises data collection for training of the artificial intelligence/machine learning model;

extending the time for the training if the artificial intelligence/machine learning operation comprises performing the training of the artificial intelligence/machine learning model;

requesting the terminal to suspend or stop the performing the training if the artificial intelligence/machine learning operation comprises performing the training of an artificial intelligence/machine learning model by the terminal; or configuring the terminal such that the data to be collected for the training are not transmitted but logged for a certain time period or until a certain event occurs if the artificial intelligence/machine learning operation comprises transmission of the data for training of the artificial intelligence/machine learning model.

The method may further comprise:

extending the time for training the artificial intelligence/machine learning model if the network receives the performance issue indication from the terminal.

The method may further comprise:

providing, to the terminal, a condition for at least criterion to decide whether or not a performance degradation is due to the artificial intelligence/machine learning operation.

Each of the methods of the fourth to sixth aspects may be a method of AI/ML operation.

According to a seventh aspect, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some embodiments of the invention, at least one of the following advantages may be achieved:

Usual RRC operation of the terminal may be not (or hardly) impaired, even if an AI/ML operation (such as training of an AI/ML training and/or data collection for that purpose) is performed;

User experience is not degraded due to AI/ML operation.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein:

FIG. 12 shows an apparatus according to an example embodiment of the invention;

FIG. 13 shows a method according to an example embodiment of the invention; and FIG. 14 shows an apparatus according to an example embodiment of the invention.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

AI/ML-based network deployments may involve AI/ML algorithms which are known to have high resource consumption. Although it is intended that the 3GPP AI/ML-based procedures use available UE-based data collection (those for RRM and/or MDT purposes), it might be necessary to adopt the NG-RAN procedures for some ML requirements. Namely, for results (e.g. predictions) with proper accuracy, proper/adjustable results cycle, or periodicity, ML algorithms may require learning from big data, variety and repetitive data collection and/or repetitive/long cycles of the trained data.

Figure 1:
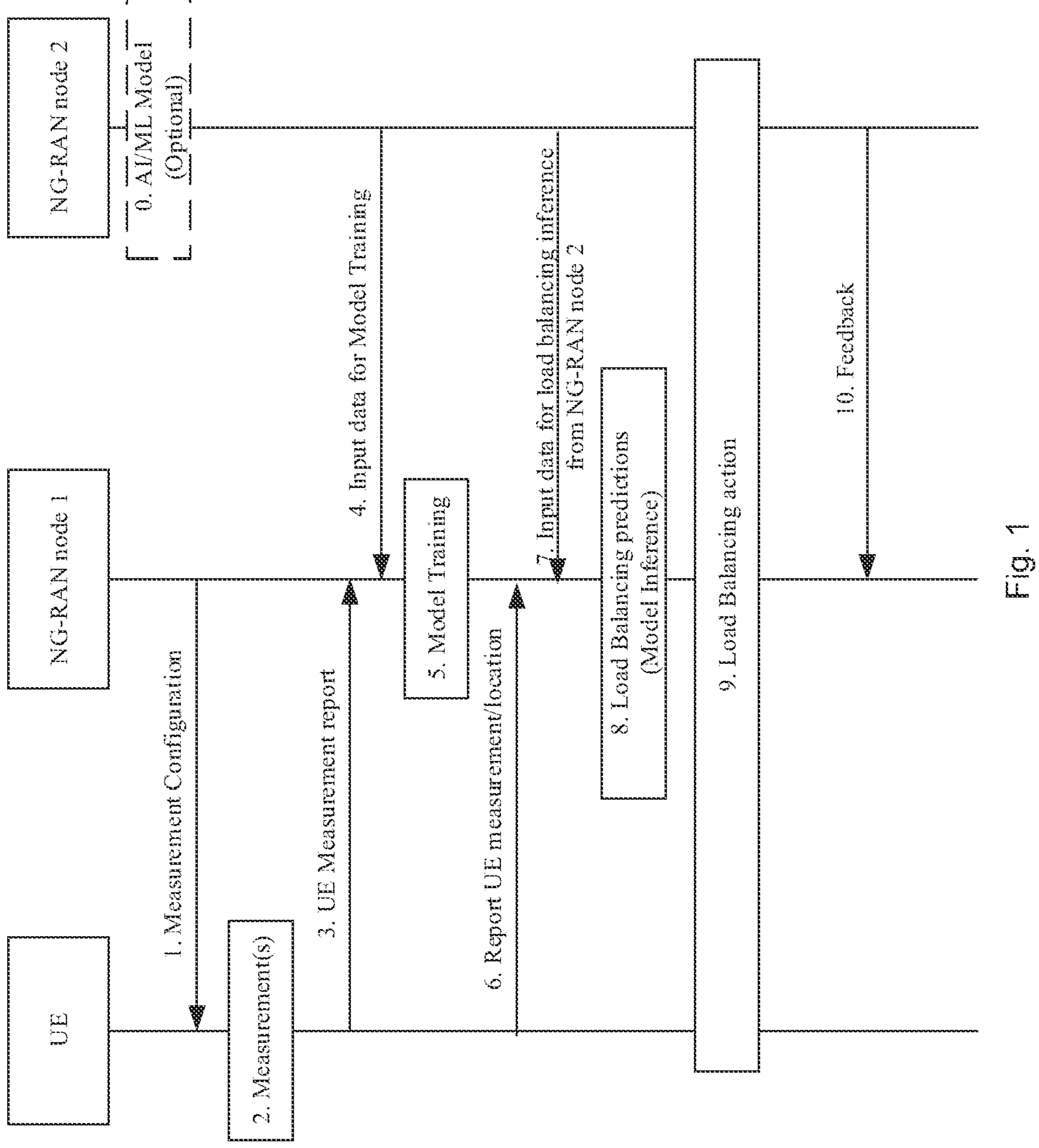
FIG. 1 depicts a message sequence chart according to 3GPP TR 37.817.

Regular RRM and MDT procedures may trigger continuous radio measurements collection from all currently defined RRC states (RRC_CONNECTED, RRC_INACTIVE, RRC_IDLE) of the UE, gathering assistance data from various device transmitters (GPS data, WiFi, Bluetooth, Sensor data). Thus, the involvement in repetitive AI/ML data collection sets at the UE may become an additional source of an overheating state of the UE, processing issues, in device co-existence interferences, connection failures, etc. The Model Training function (see FIG. 1) with a target to detect a pattern which leads to the UE overheating may imply stress situations to the UE at a higher rate than regular radio operations.

It is expected that for AI/ML, the UE remains in the control of the network, and UE responds to radio performance issues by triggering a recovery procedure (e.g. RRC Reestablishment in case of RLF) or by transmitting assistance information to the network (UE Assistance Information in case of overheating detection) for further network reaction to steer the UE on how to overcome radio performance degradation detected by the UE. E.g. the network may adopt or release some demanding configurations like Carrier aggregation or Dual Connectivity etc. However, regular operations to overcome radio performance degradation (e.g. by releasing carriers causing performance issues) might conflict with ML Model Training policies (e.g. if the policy requests to repeat the measurement with the same carrier configuration).

The existing methods do not recognize internal UE issues caused by increased data generation for AI/ML purposes. In addition, a UE's performance degradation may be caused by AI/ML algorithms hosted in the UE itself. While the frequency of the related procedures/actions/data collection and UE-detected issues increases due to more frequently and/or intensely applying AI/ML in RAN, it leverages the device performance even for basic radio operations.

Some example embodiments of the invention provide a method to prevent UE performance degradation due to AI/ML operation, such as increased data generation for AI/ML purposes and/or due to performing training of an AI/ML model, by assigning higher priority to regular radio operations than to procedures related to AI/ML operations.

For this purpose, according to some example embodiments of the invention, the following actions may be taken:

- The UE detects whether or not a performance degradation is likely due to AI/ML operation, i.e., involvement in Data Collection phase (or during training phase) for AI/ML
  - The UE may categorize a current radio performance as performance degradation or anomalous situation due to AI/ML operation
    - For that purpose, the UE may use the regular RRM/RRC operations and failures resulting from AI/ML related operation (e.g. from continuous experience of overheating in the UE)
    - Alternatively or in addition, the performance degradation or anomalous situation due to AI/ML operation may be determined internally based on a AI/ML algorithm running in the UE. For example, such a AI/ML algorithm may detect that AI/ML Training in the UE takes more time than anticipated
  - For the categorization of the performance degradation in the UE, the UE may deploy an AI/ML state machine
- Upon detecting the AI/ML operation based performance issue at the UE, the AI/ML operation may be controlled such that the performance issue is removed or reduced. As an example of AI/ML operation, data collection is used in the following two bullet points. However, the invention is not limited to data collection and may be applied to other AI/ML operation (such as transmitting the collected data to the network or performing AI/ML training) at the UE, too.
  - The network entity that performs AI/ML Model Training may adjust the measurement configuration of the UE. For example, the network may reconfigure the measurement configuration for the AI/ML input data.
    - In a particular case, the network may provide a fallback configuration to the UE in advance, and if the UE detects the performance degradation due to AI/ML operation, it may adopt the fallback measurement configuration.
    - Typically, RRM performance should have higher priority than AI/ML operation. In one example embodiment, the volume of data collected for AI/ML training may be adjusted in accordance with the intensity of the overheating. In another example embodiment, the resolution of the data collected may be adjusted (e.g. lower granularity or quantized RSRP and/or RSRQ and/or SINR values). Yet, in another example embodiment, the resolution of the collected data adjustment may be achieved by setting longer time to train the ML model
  - The adapted measurement configuration may be activated upon UE-based or NW-based (UE-assisted) detection of an performance issue at the UE due to AI/ML operation
  - In some example embodiments, the data collection for AI/ML operation may be controlled internally by the UE
    - the UE may decide Data Collection modification upon UE-based performance degradation detection due to AI/ML operation at the UE. Such data collection modification may include e.g. release, postpone and/or logging the measurement, postpone measurement results provision, prolong measurement reporting cycle, etc.

Figure 2:
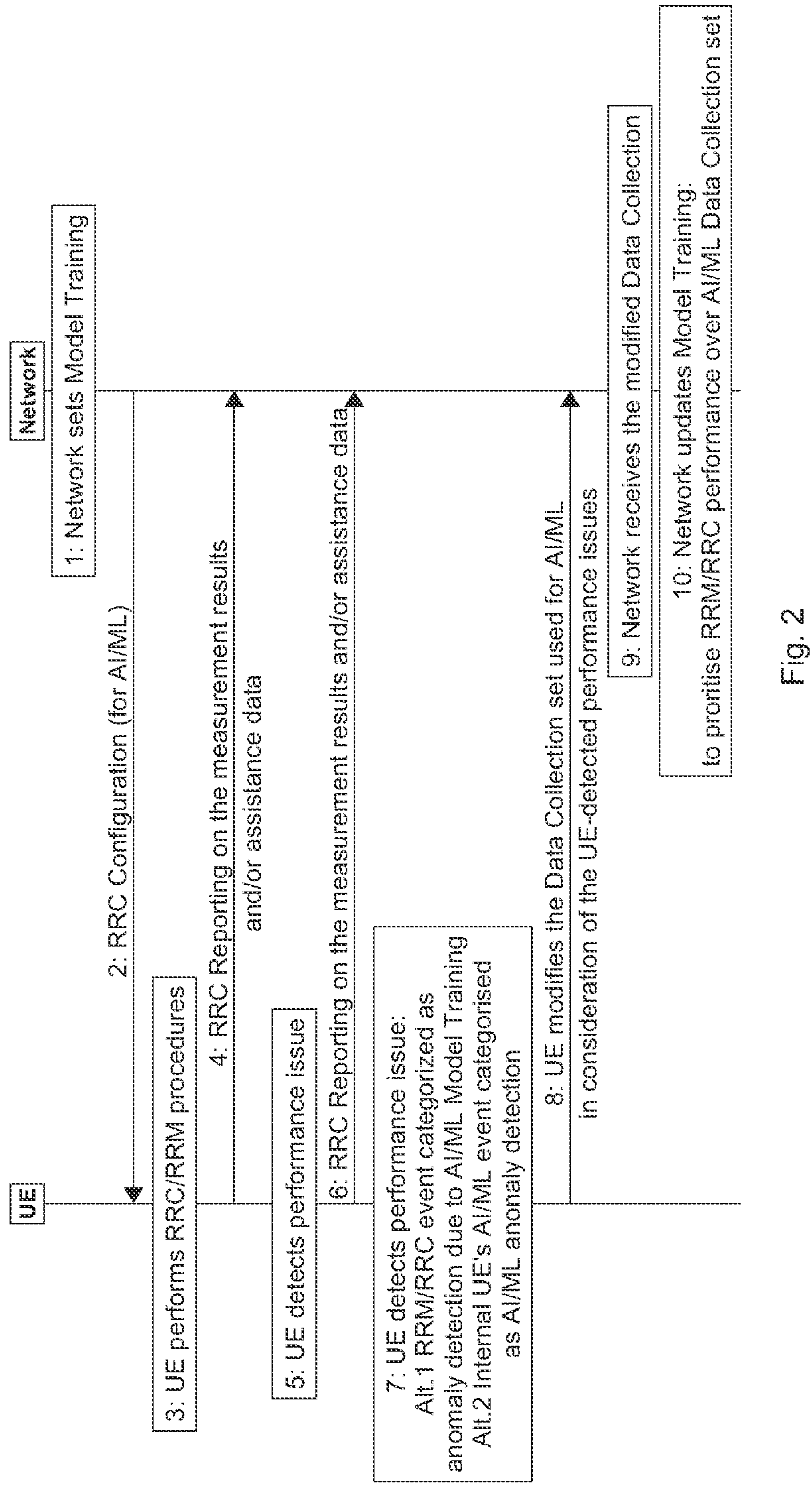
FIG. 2 depicts a message sequence chart according to some example embodiments of the invention.

FIG. 2 shows a message sequence chart according to some example embodiments of the invention. In FIG. 2, UE detects performance issues and impacts AI/ML Model Training. The actions are as follows:

Action 1: The network sets an ML Model Training

Action 2-6: Regular RRM/RRC operations ongoing, including performance issues detection (e.g. overheating, RLF, action 5) and their handling according to the existing principles (e.g. sending UEAssistanceInformation message, or RRCReestablishement, respectively, action 6)

Action 7: The UE determines an event (performance degradation) as caused by AI/ML operation. As an example for such determination:

The UE detects the radio performance issue becomes repetitive (e.g. overheating keeps the status, RLF occurs too frequently for certain time Action 8: The UE modifies the Data Collection set for AI/ML operation, including of the following actions:

Suspend/postpone/log/release the Data Collection set, and

Notify the NW about the issue (e.g. new information element in RRC signalling message UEAssistanceInformation, or UEInformationResponse)

Action 9: The network receives the Data Collection reports

Action 10: The network updates the Model Training to respect the RRM/RRC policies, and deprioritizes AI/ML Model Training in a way it postpones its observation (e.g., longer timer for the training of the Model)

Figure 3:
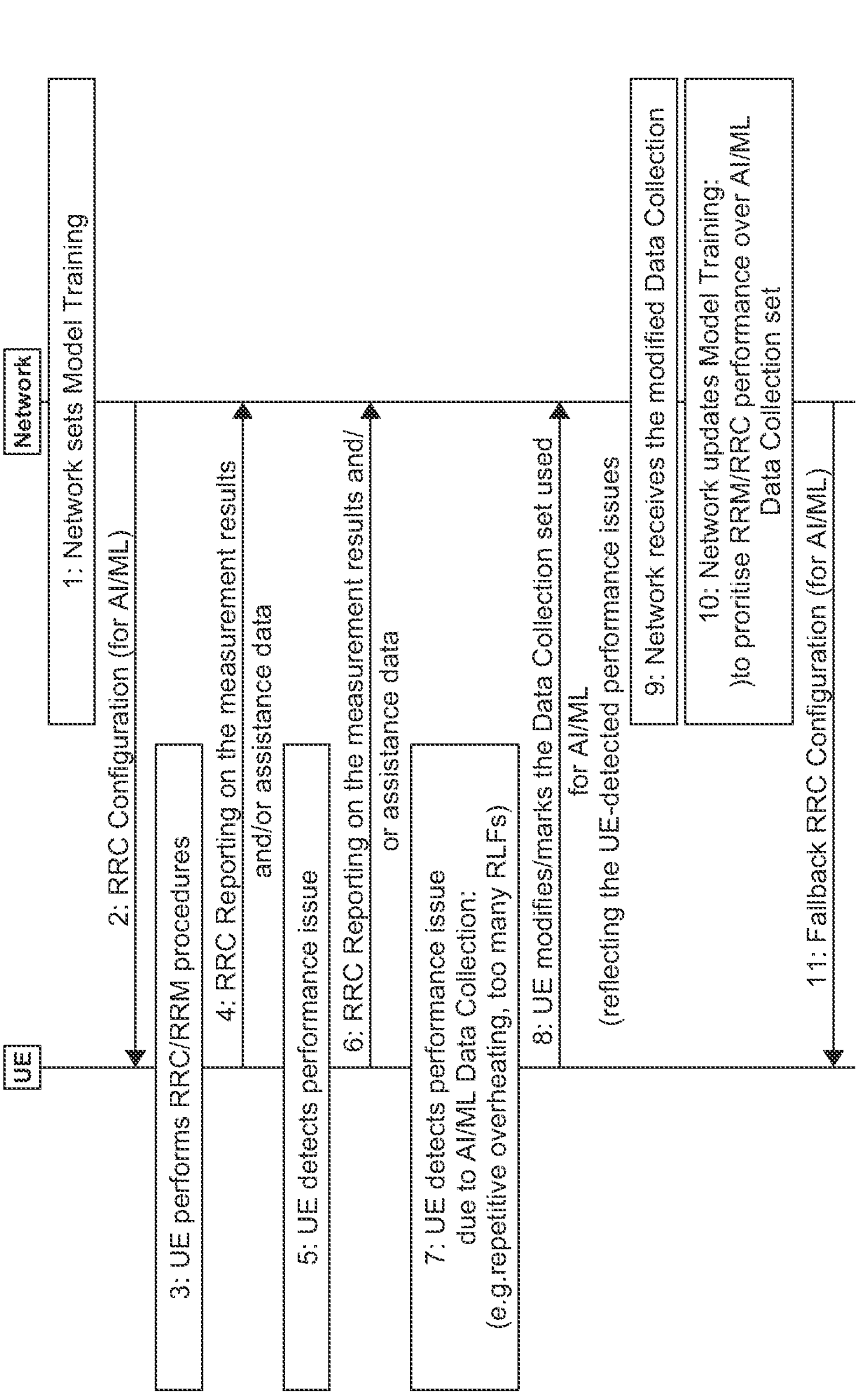
FIG. 3 depicts a message sequence chart according to some example embodiments of the invention.

FIG. 3 shows another message sequence chart according to some example embodiments of the invention. FIG. 3 comprises a NW-controlled fallback for AI/ML Model Training in the UE. The actions are as follows:

Action 1: The network sets an ML Model Training

Action 2-6: Regular RRM/RRC operations ongoing, including performance issues detection (e.g. overheating, RLF, action 5) and their handling according to the existing principles (e.g. sending UEAssistanceInformation message, or RRCReestablishement, respectively, action 6)

Action 7: The UE determines an event as performance degradation due to AI/ML operation, e.g.:

The UE detects the radio performance issue becomes repetitive (i.e.: overheating keeps the status, RLF occurs too frequently for certain time, or Based on a running AI/ML algorithm in the UE internally and e.g., detecting that AI/ML Training in the UE takes more time than anticipated Action 8: The UE sends assistance information about the detected issue to the network, e.g.:

A new information element in RRC signalling message UEAssistanceInformation, or UEInformationResponse The information is an explicit or implicit request to modify the Data Collection set for AI/ML, including the following actions:

Suspend, log or release Data Collection

Postpone Data Collection reporting

Action 9: The network receives the Assistance Information

Figure 4:
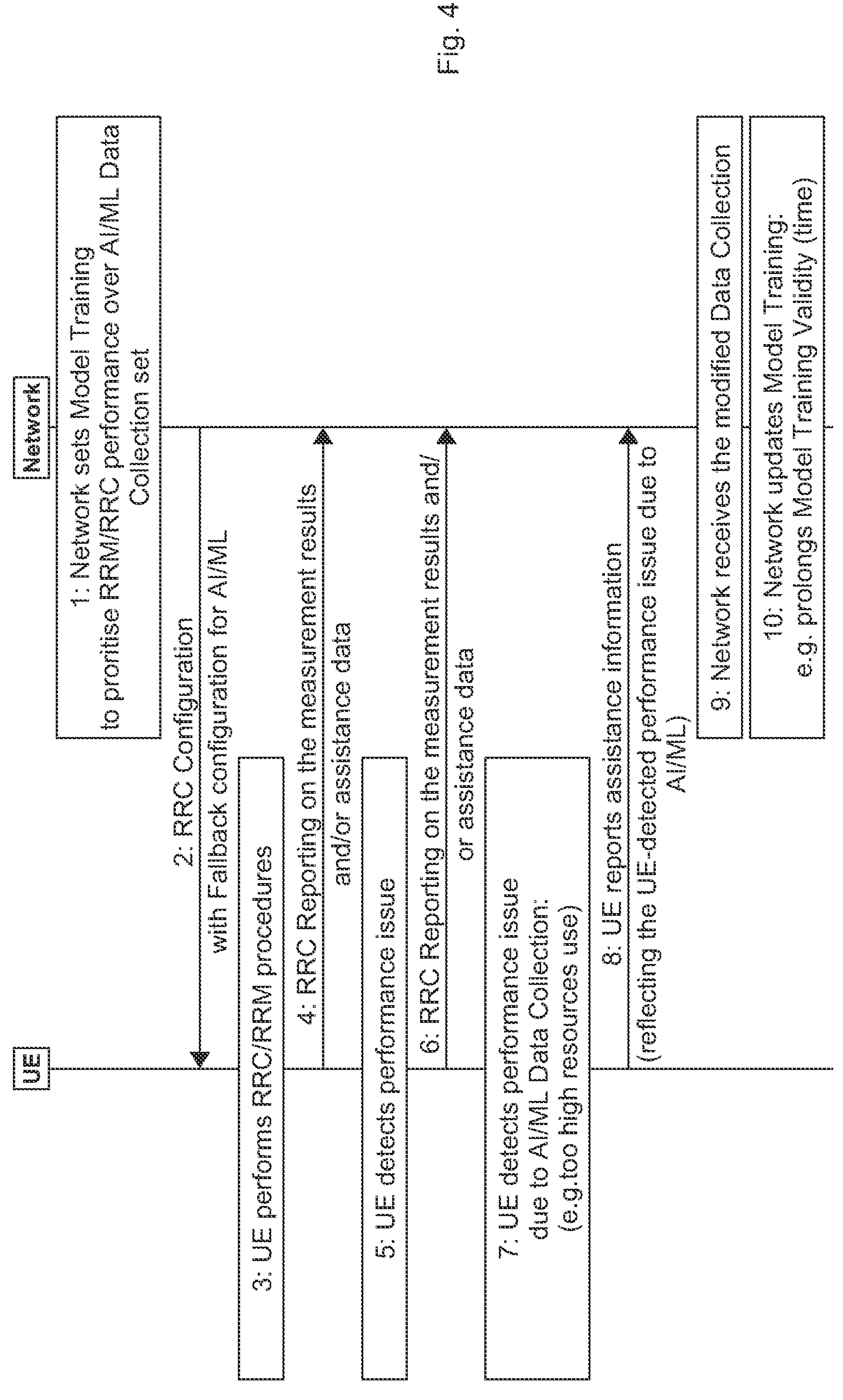
FIG. 4 depicts a message sequence chart according to some example embodiments of the invention.

Action 10: The network updates the Model Training accordingly, with respect to respect the RRM/RRC policies Action 11: The network updates the UE configuration accordingly with the Model Training Update This message sequence may be modified such that the network sends a fallback measurement configuration before the UE detects the performance degradation due to the AI/ML operation. Such an example embodiments of the invention is shown in FIG. 4. The actions are as follows:

Action 1: The network sets an ML Model Training with priority to RRM/RRC events

Action 2: The network sends to the UE, in addition to the usual measurement configuration, an AI/ML Fallback measurement configuration to be activated upon the UE detects performance degradation due to AI/ML operation In particular, for RRC_IDLE or RRC INACTIVE UEs, the Fallback configuration may be sent in advance (e.g. along with LoggedMeasurementsConfiguration), or it may be preconfigured (or even hard-coded) in the UE Action 3-6: Regular RRM/RRC operations ongoing, including performance issues detection (e.g. overheating, RLF, action 5) and their handling according to the existing principles (e.g. sending UEAssistanceInformation message, or RRCReestablishement, respectively, action 6)

Action 7: The UE determines an event as performance degradation due to AI/ML operation, e.g.:

The UE detects the performance issue becomes repetitive (e.g. overheating keeps the status, RLF occurs too frequently for certain time The status check can be based on NW configuration (if AI/ML purpose is active)

Figure 5:
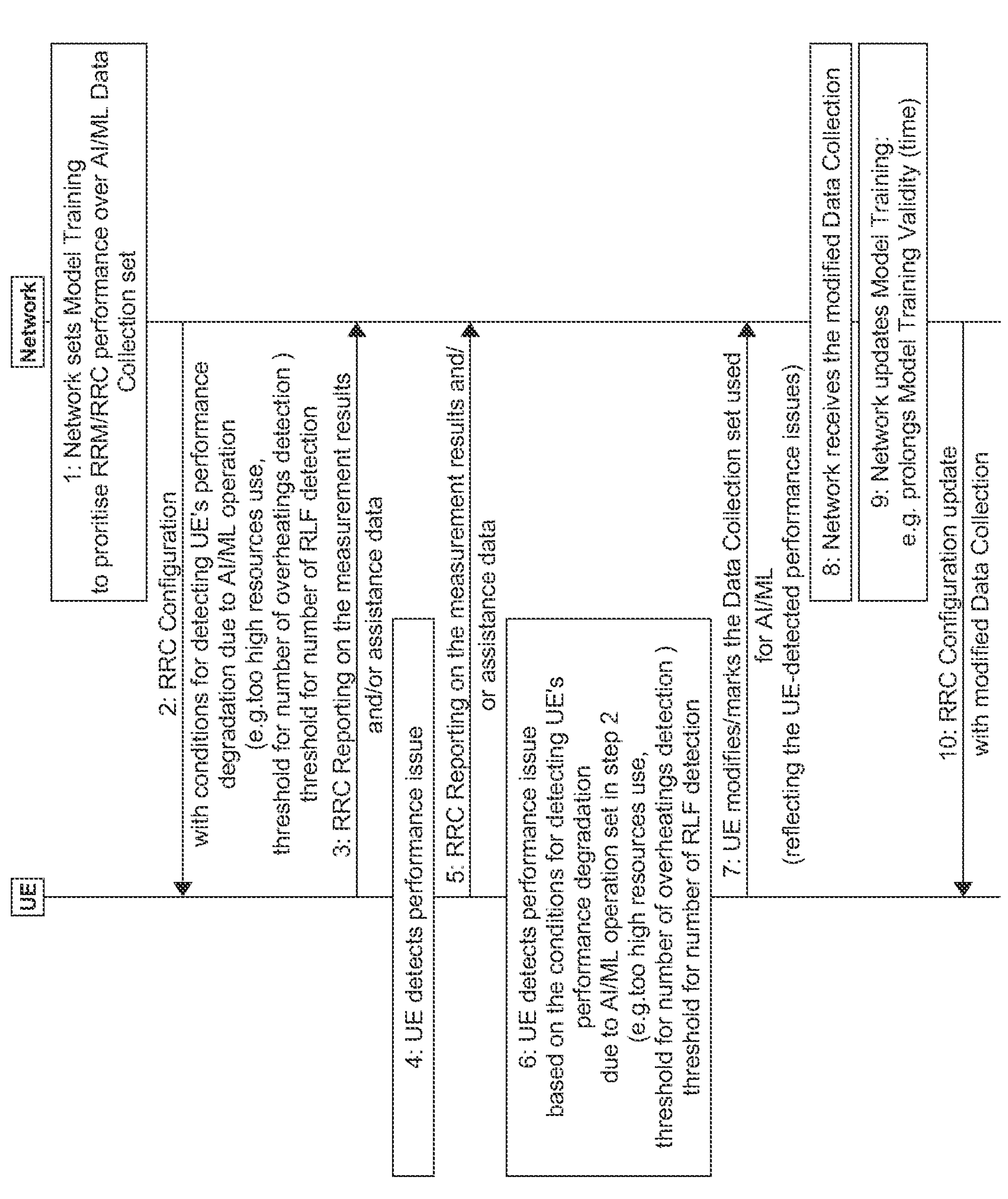
FIG. 5 depicts a message sequence chart according to some example embodiments of the invention.

The Network configuring Data Collection set for AI/ML configures the UE with triggering condition for detecting anomalous situation Action 8: The UE sends assistance information about the issue (e.g. new information element in RRC signalling message UEAssistanceInformation, or UEInformationResponse) and adopts the fallback measurement configuration Action 9: The network receives the Assistance Information Action 10: The network updates the Model Training to respect the RRM/RRC policies FIG. 5 shows another message sequence chart according to some example embodiments of the invention. It comprises NW-preconfigured conditions for detecting UE's performance degradation due to AI/ML operation. The actions are as follows:

Action 1: The network sets an ML Model Training

Action 2: The network sets conditions on UE's performance degradation due to AI/ML operation:

a threshold for radio resources use (for example maximum data rate for data measured in AI/ML Data Collection)

a threshold for number of overheatings detection (in a certain time)

a threshold for a number of RLF detection (in a certain time)

Actions 3-5: Regular RRM/RRC operations ongoing, including performance issues detection (e.g. overheating, RLF, action 4) and their handling according to the existing principles (e.g. sending UEAssistanceInformation message, or RRCReestablishement, respectively, action 5)

Action 6: The UE determines an event as performance degradation due to AI/ML operation based on the preconfigured conditions:

a threshold for radio resources use reached or exceeded a threshold for number of overheatings detection reached or exceeded a threshold for a number of RLF detection reached or exceeded Action 7: The UE sends assistance information about the detected issue Action 8: The network receives the Assistance Information Action 9: The network updates the Model Training accordingly, with respect to respect the RRM/RRC policies Action 10: The network updates the UE measurement configuration accordingly with the Model Training Update The actions of FIGS. 2 to 5 may be repeated e.g. periodically and/or due to a specific trigger event. Thus, e.g. the UE may return to the previous measurement configuration if the performance degradation disappears.

If the network does not provide any condition for a certain criterion, the UE may apply a predefined criterion for that criterion.

Figure 6:
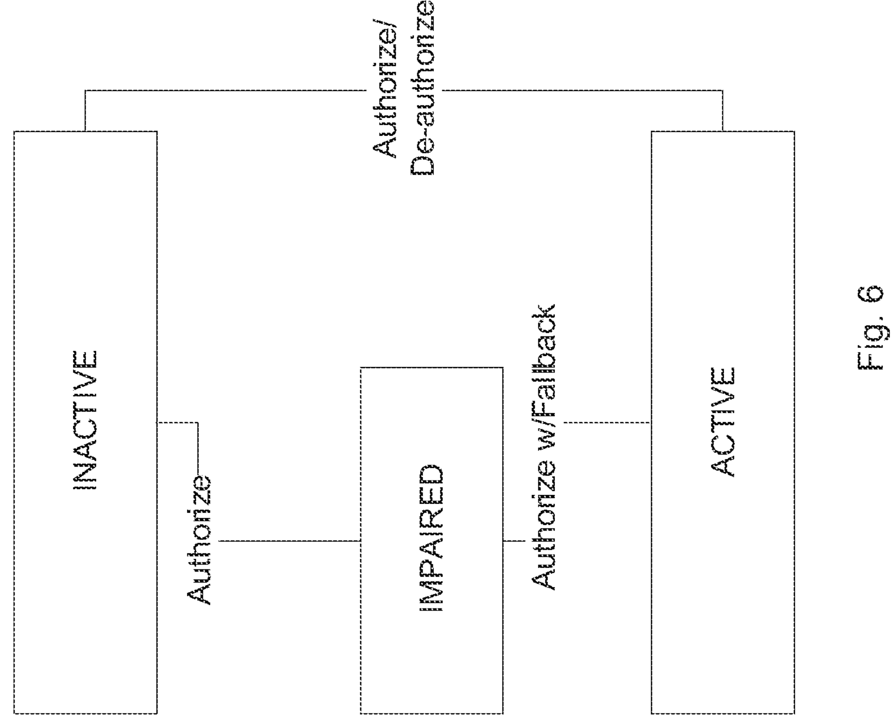
FIG. 6 depicts a AI/ML state machine in the UE according to some example embodiments of the invention.

UE's based performance issue detection (in any of the above methods) may be based on an AI/ML state machine, which distinguishes 3 states, as depicted in FIG. 6:

Inactive (i.e.: ML is not active)
- There is no AI/ML operation detected—neither internal UE operation, nor NW configuration for AI/ML received Impaired (ML is operating with reduced capability)
- There is AI/ML operation detected, but the detected issue impaired an adjustment in the Data Collection set for AI/ML Active (AI/ML is active)
- There is AI/ML operation ongoing with no performance issues detected AI/ML State transition can be:

Network controlled (UE is in RRC Connected) or pre-configured (in particular if UE is in RRC Idle or Inactive), UE based.

The ML States are applicable to all RRC States i.e., ML state can be ACTIVE, IMPAIRED or INACTIVE in any of the RRC States.

When the UE is RRC Connected and UE detects performance issues and depending on the Assistance information reported by the UE, network may send a command to the UE to transition to ML_IMPAIRED or ML_INACTIVE For the UE-controlled state transition, when the UE is RRC Connected and UE detects performance issues, it performs a transition to ML_IMPAIRED or ML_INACTIVE based on internal check:
- For example, if the performance issue is minor, training can be disabled while Inference can be active (ML_IMPAIRED). If the performance issue is major, all ML related tasks can be disabled (ML_INACTIVE)

When the UE is in RRC IDLE or RRC Inactive state, the network provides pre-configured instructions by which the UE decides the ML State to which it should transition to. The configuration may include the Resource Utilization Threshold for ML tasks and the corresponding state transition (Table 1).

For the UE-controlled state transition, when the UE is RRC IDLE or RRC Inactive and UE detects performance issues, it performs a transition to ML_IMPAIRED or ML_INACTIVE based on internal check

TABLE 1

AI/ML State transitions conditions and related actions according to some example embodiments of the invention.

| Sl. No | RRC State | Current ML State | Performance Degradation | Proposed Action |
|---|---|---|---|---|
| 1 | RRC Connected | ML Active | >10% | Move to ML Impaired |
| 2 | RRC Connected | ML Active | >30% | Move to ML Inactive |

With the AI/ML state machine deployment, the UE can indicate a degree of degradation of its performance, so that the UE sends performance degradation issue accordingly (e.g. Action 7 in FIG. 5) based on the predefined threshold at least with two steps (e.g., >10% and >30%). With this approach the UE indicates the problem severity gradually. Through first notification, the network knows that the UE is going to experience some problem (degradation ~10%—bad, but still manageable) and can reduce the processing load on the UE compared to a case that the UE actually suffering from severe degradation or performance (>30%, impaired).

Figure 7:
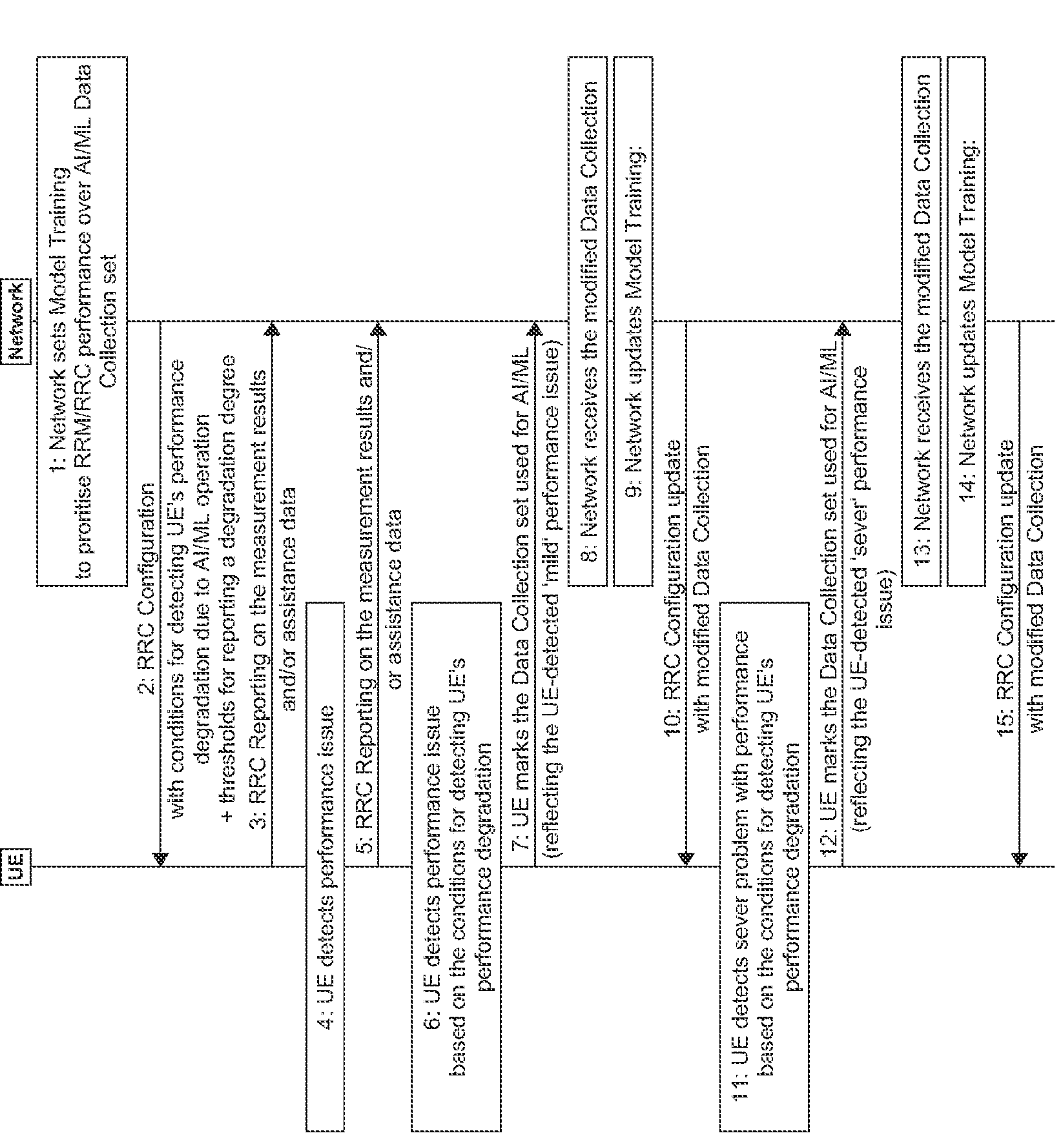
FIG. 7 depicts a message sequence chart according to some example embodiments of the invention.

FIG. 7 depicts an exemplary realisation, where the UE informs the network about the performance degradation according to the degree of degradation of its performance. Compared to the method of FIG. 5, the UE sends assistance information that distinguishes the degree of performance degradation:

Actions 1 to 5: same as in FIG. 5, but in action 2, network provides thresholds for reporting a performance degradation degree Action 6: UE detects a mild problem in performance, i.e.: it experiences problem ~10% but it is still manageable. It may means, for example, that the UE can still manage to Train an ML Model, though slower than usual, or even though overheating happens and slows down UE operation, UE can still function in its normal operations, or even though the number of RLFs is having a continuous pattern UE, UE performance e.g., in terms of a throughput doesn't drop below a threshold.

Action 7: The UE sends assistance information about the detected issue

Actions 8-10: same as in FIG. 5

Action 11: UE detects a severe problem due to AI/ML operations

Action 12: The UE sends assistance information about the detected issue

Actions 13-15: Network modifies Model Training to consider Data Collection (the UE measurements shortly before the problem until the problem is resolved) as untrustworthy and/or not to be considered in future trainings, due to the UE severe problem (e.g., overheated)

Figures 8, 9, 10, 11:
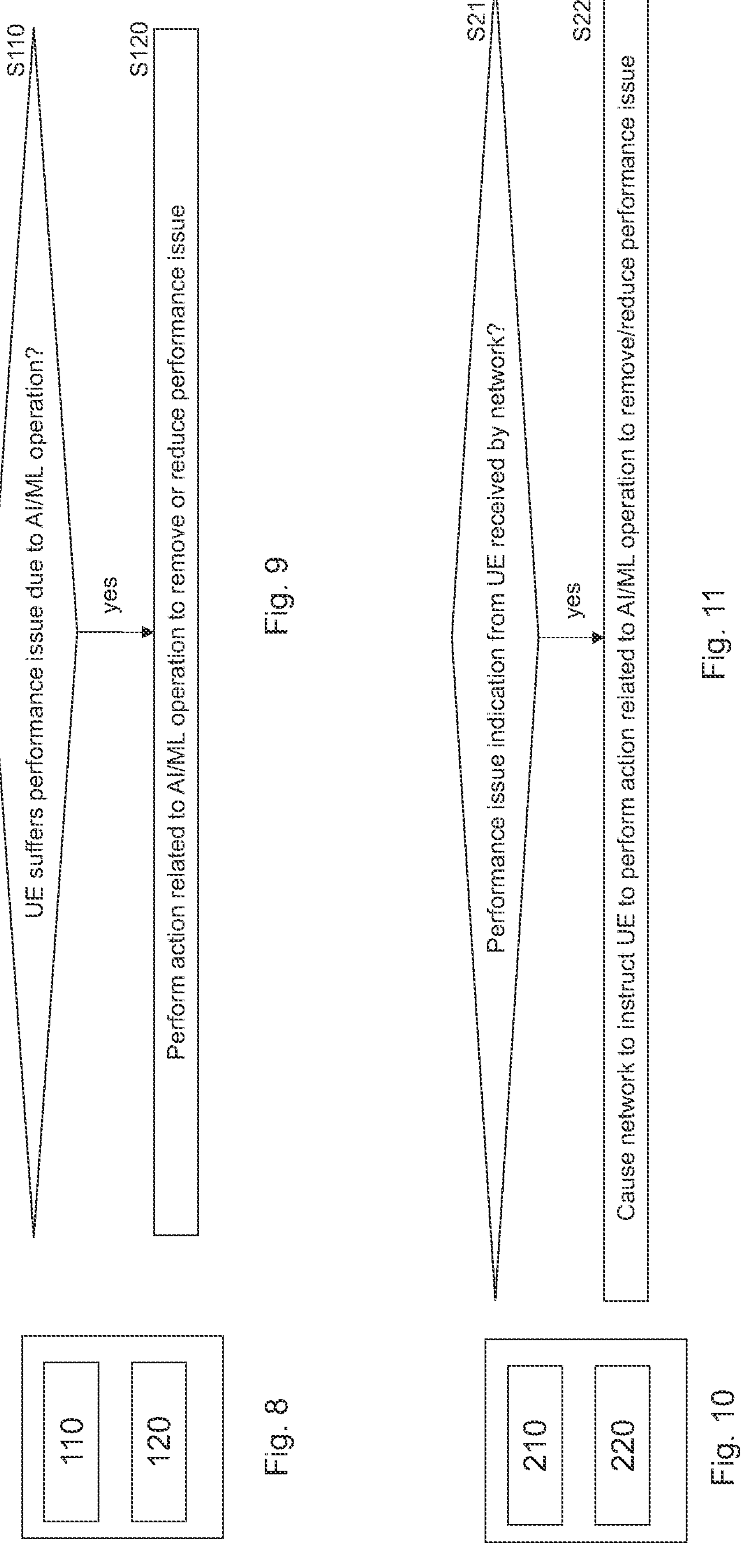
FIG. 8 shows an apparatus according to an example embodiment of the invention.
FIG. 9 shows a method according to an example embodiment of the invention.
FIG. 10 shows an apparatus according to an example embodiment of the invention.
FIG. 11 shows a method according to an example embodiment of the invention.

FIG. 8 shows an apparatus according to an example embodiment of the invention. The apparatus may be a terminal, such as a UE, or an element thereof. FIG. 9 shows a method according to an example embodiment of the invention. The apparatus according to FIG. 8 may perform the method of FIG. 9 but is not limited to this method. The method of FIG. 9 may be performed by the apparatus of FIG. 8 but is not limited to being performed by this apparatus.

The apparatus comprises means for monitoring 110 and means for performing 120. The means for monitoring 110 and means for performing 120 may be a monitoring means and performing means, respectively. The means for monitoring 110 and means for performing 120 may be a monitor and performer, respectively. The means for monitoring 110 and means for performing 120 may be a monitoring processor and performing processor, respectively.

The means for monitoring 110 monitors whether a terminal suffers a performance issue due to an AI/ML operation performed by the terminal (S110). For example, the means for monitoring 110 may first detect a performance issue and then decide whether or not the performance issue is caused by AI/ML operation. As another option, the means for monitoring 110 may monitor whether the terminal suffers a performance issue known to be caused by AI/ML operation. In this case, a decision after the detection of the performance issue is not needed.

If the terminal suffers the performance issue due to the AI/ML operation (S110=yes), the means for performing 120 performs an action related to the AI/ML operation to remove or reduce the performance issue (S120).

FIG. 10 shows an apparatus according to an example embodiment of the invention. The apparatus may be a network node, such as a base station (e.g. gNB or eNB), or an element thereof. FIG. 11 shows a method according to an example embodiment of the invention. The apparatus according to FIG. 10 may perform the method of FIG. 11 but is not limited to this method. The method of FIG. 11 may be performed by the apparatus of FIG. 10 but is not limited to being performed by this apparatus.

The apparatus comprises means for monitoring 210 and means for causing 220. The means for monitoring 210 and means for causing 220 may be a monitoring means and causing means, respectively. The means for monitoring 210 and means for causing 220 may be a monitor and causer, respectively. The means for monitoring 210 and means for causing 220 may be a monitoring processor and causing processor, respectively.

The means for monitoring 210 monitors whether a network receives a performance issue indication from a terminal (S210). The performance issue indication indicates that the terminal suffers a performance degradation due to a AI/ML operation performed by the terminal.

If the network receives the performance issue indication (S210=yes), the means for causing 220 causes the network to instruct the terminal to perform an action related to the AI/ML operation (S220). The action is to remove or reduce the performance issue.

FIG. 12 shows an apparatus according to an example embodiment of the invention. The apparatus may be a network node, such as a base station (e.g. gNB or eNB), or an element thereof. FIG. 13 shows a method according to an example embodiment of the invention. The apparatus according to FIG. 12 may perform the method of FIG. 13 but is not limited to this method. The method of FIG. 13 may be performed by the apparatus of FIG. 12 but is not limited to being performed by this apparatus.

The apparatus comprises means for causing 310, first means for setting 320, means for monitoring 330, and second means for setting 340. The means for causing 310, first means for setting 320, means for monitoring 330, and second means for setting 340 may be a causing means, first setting means, monitoring means, and second setting means, respectively. The means for causing 310, first means for setting 320, means for monitoring 330, and second means for setting 340 may be a causer, first setter, monitor, and second setter, respectively. The means for causing 310, first means for setting 320, means for monitoring 330, and second means for setting 340 may be a causing processor, first setting processor, monitoring processor, and second setting processor, respectively.

The means for causing 310 causes a network to provide, to a terminal, a configured measurement configuration and a fallback measurement configuration different from the configured measurement configuration (S310). The first means for setting 320 sets a training of an AI/ML model such that measurement results according to the configured measurement configuration are used for the training (S320).

The means for monitoring 330 monitors whether the network receives a performance issue indication from the terminal (S330). The performance issue indication indicates that the terminal suffers a performance degradation due to an AI/ML operation performed by the terminal.

If the network receives the performance issue indication from the terminal (S330=yes), the second means for setting 340 sets the training of the AI/ML model such that measurement results according to the fallback measurement configuration are used for the training (S340).

FIG. 14 shows an apparatus according to an example embodiment of the invention. The apparatus comprises at least one processor 810, at least one memory 820 storing instructions that, when executed by the at least one processor 810, cause the apparatus at least to perform the method according to at least one of the following figures and related description: FIG. 9, or FIG. 11, or FIG. 13.

Some example embodiments are described such that it seems to be certain that a performance degradation at the UE is caused by some AI/ML operation. However, in general, one may not decide with certainty whether or not the performance degradation is caused by the AI/ML operation. Therefore, typically, it is sufficient that the performance degradation is likely (e.g. with at least a minimum likelihood) caused by the AI/ML operation. For example, a certain pattern of the UE performance (e.g. due to some RRC reconfiguration or without such RRC reconfiguration) may imply that the performance degradation is likely caused by the AI/ML operation.

Some example embodiments are explained with respect to a 5G network. However, the invention is not limited to 5G. It may be used in other communication networks, too, e.g. in previous of forthcoming generations of 3GPP networks such as 4G, 6G, or 7G, etc. It may be used in non-3GPP communication networks, too.

A terminal may be an end-user equipment of the respective technology, such as a UE. It may be a MTC device, a laptop, a smartphone, a mobile phone etc.

A base station may be a base station of the respective technology, such as a gNB or a eNB.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality. The same applies correspondingly to the terminal.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a base station (e.g. eNB or gNB), or a component thereof, an apparatus embodying the same, a method for controlling and/or operating the same, and computer program(s) controlling and/or operating the same as well as mediums carrying such computer program(s) and forming computer program product(s). According to the above description, it should thus be apparent that example embodiments of the present invention provide, for example, a terminal (e.g. UE), or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred example embodiments of the present invention. However, it should be noted that the description of the preferred example embodiments is given by way of example only and that various modifications may be made without departing from the scope of the invention as defined by the appended claims.

The terms "first X" and "second X" include the options that "first X" is the same as "second X" and that "first X" is different from "second X", unless otherwise specified. As used herein, "at least one of the following: <a list of two or more elements>" and "at least one of <a list of two or more elements>" and similar wording, where the list of two or more elements are joined by "and" or "or", mean at least any one of the elements, or at least any two or more of the elements, or at least all the elements.

The invention claimed is:

1. A user equipment comprising:

one or more processors, and memory storing instructions that, when executed by the one or more processors, cause the user equipment to:

monitor, while a regular radio operation prioritized over an artificial intelligence/machine learning operation is ongoing, whether the user equipment suffers a performance issue due to the artificial intelligence/machine learning operation; and in response to detecting the performance issue, perform measurement configuration adaptation for data collection for the artificial intelligence/machine learning operation to remove or reduce the performance issue.

2. The apparatus according to claim 1, wherein the artificial intelligence/machine learning operation comprises at least one of the following:

data collection for the training of an artificial intelligence/machine learning model;

performing training of the artificial intelligence/machine learning model; or transmitting the data collected for training of the artificial intelligence/machine learning model.

3. The apparatus according to claim 1, wherein the instructions, when executed by the one or more processors, further cause the apparatus to:

supervise whether the user equipment receives, from the network, in addition to a configured measurement configuration, a fallback measurement configuration for a case that the user equipment suffers the performance issue due to the artificial intelligence/machine learning operation; wherein the performing measurement configuration adaptation by the user equipment comprises adopting the fallback measurement configuration in the user equipment if the user equipment receives the fallback measurement configuration.

4. The apparatus according to claim 1, wherein the instructions, when executed by the one or more processors, cause the user equipment to monitor whether the user equipment suffers the performance issue due to the artificial intelligence/machine learning operation by at least one of the following criteria:

monitoring whether the performance issue occurs more frequently than a frequency threshold; or performing an activity for resolving the performance issue and then monitoring whether the performance issue is not solved due to the activity, wherein the activity is not related to the artificial intelligence/machine learning operation; or monitoring whether the training of the artificial intelligence/machine learning model takes longer than expected if the training of the artificial intelligence/machine learning training is performed by the user equipment; or monitoring whether the user equipment uses too many resources.

5. The apparatus according to claim 1, wherein a status of the artificial intelligence/machine learning operation is reflected in a state machine, wherein the state machine has a status that is any of active, impaired, or inactive.

6. The apparatus of claim 1, wherein the measurement configuration adaptation is performed by at least one of the following: adjusting volume of data, adjusting resolution of the data, postpone measurements, prolong measurement reporting cycle, or setting longer time for training of a model in association with the artificial intelligence/machine learning operation.

7. A method comprising:

monitoring, by a user equipment while a regular radio operation prioritized over an artificial intelligence/machine learning operation is ongoing, whether the user equipment suffers a performance issue due to the artificial intelligence/machine learning operation; and in response to detecting the performance issue, performing, by the user equipment, measurement configuration adaptation for data collection for the artificial intelligence/machine learning operation to remove or reduce the performance issue.

8. The method according to claim 7, wherein the artificial intelligence/machine learning operation comprises at least one of the following:

data collection for the training of an artificial intelligence/machine learning model;

performing training of the artificial intelligence/machine learning model; or transmitting the data collected for training of the artificial intelligence/machine learning model.

9. The method according to claim 7, further comprising: supervising whether the user equipment receives, from the network, in addition to a configured measurement configuration, a fallback measurement configuration for a case that the user equipment suffers the performance issue due to the artificial intelligence/machine learning operation; wherein the performing measurement configuration adaptation by the user equipment comprises adopting the fallback measurement configuration in the user equipment if the user equipment receives the fallback measurement configuration.

10. The method according to claim 7, wherein a status of the artificial intelligence/machine learning operation is reflected in a state machine, wherein the state machine has a status that is any of active, impaired, or inactive.

11. The method of claim 7, wherein the measurement configuration adaptation is performed by at least one of the following: adjusting volume of data, adjusting resolution of the data, postpone measurements, prolong measurement reporting cycle, or setting longer time for training of a model in association with the artificial intelligence/machine learning operation.

* * * * *